(12) United States Patent
Banes et al.

(10) Patent No.: US 8,332,650 B2
(45) Date of Patent: Dec. 11, 2012

(54) SYSTEMS AND METHODS FOR SETTING AND RESETTING A PASSWORD

(75) Inventors: John Banes, Kirkland, WA (US);
George Masters, Redmond, WA (US);
Glenn D. Pittaway, Woodinville, WA (US); Jonathan David Hubbard, Arnold, MD (US); Peter J. Skelly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2487 days.

(21) Appl. No.: 10/105,014

(22) Filed: Mar. 22, 2002

(65) Prior Publication Data

US 2003/0182584 A1 Sep. 25, 2003

(51) Int. Cl.
*G06F 21/00* (2006.01)
(52) U.S. Cl. ........................................ 713/182
(58) Field of Classification Search .................. 713/202, 713/182–184; 726/2, 5
See application file for complete search history.

(56) References Cited

U.S. PATENT DOCUMENTS

| 4,995,081 | A  | * | 2/1991  | Leighton et al. ............ 713/186 |
| 5,719,941 | A  |   | 2/1998  | Swift |
| 5,944,824 | A  | * | 8/1999  | He ................................... 726/6 |
| 6,370,649 | B1 | * | 4/2002  | Angelo et al. .............. 713/202 |
| 6,725,382 | B1 | * | 4/2004  | Thompson et al. ........... 726/19 |
| 2003/0065919 | A1 | * | 4/2003 | Albert et al. ................ 713/168 |
| 2003/0185398 | A1 | * | 10/2003 | Hypponnen .................. 380/277 |

\* cited by examiner

*Primary Examiner* — Ali Abyaneh
(74) *Attorney, Agent, or Firm* — Lee & Hayes, PLLC

(57) ABSTRACT

A password reset disk is created using a private key/public key pair. The private key is stored on a removable computer-readable medium so that it can be removed and securely stored remote from the computer system on which it was created. The public key is stored on the computer system and used to maintain an encrypted copy of the current password to be stored on the computer system. If the user forgets a password, the user may insert the password reset disk into the computer system. The private key is retrieved from the password reset disk and the encrypted password is decrypted using the private key. If the decryption is successful, the user is allowed to set a new password. The password reset disk is effective even if the user password has been changed since the creation of the password reset disk.

34 Claims, 6 Drawing Sheets

PERSONAL COMPUTER
100

PASSWORD
RESET DISK
102

PASSWORD MODULE

PASSWORD RESET DISK CREATOR

PASSWORD RESET MODULE

SYSTEMS AND METHODS FOR SETTING AND RESETTING A PASSWORD

TECHNICAL FIELD

The present invention relates to computer system security. In particular, the invention relates to systems and methods for setting and resetting a user password in a system for which a user has forgotten the user's password that allows the user to access the system.

BACKGROUND

The most frequent customer service call received by most computer system or software program manufacturers is a request from a customer who has forgotten his password to access a system. The manufacturer typically has a system in place by which the manufacturer can provide the user with the user's password so the user can return to using the system.

This type of password restore system has several disadvantages, not the least of which is a concern for security. In any system in which a user's password is communicated by telephone or network, i.e., any method by which the user does not present positive identification to receive access to secure systems, there is a danger that a non-authorized person will be granted access to a secure system. Of course, several methods are used to reduce the possibility of unauthorized access, but the security threat always exists to some extent.

Another password restore system involves maintaining a static "back door" maintenance password so that an external agent can access one or more accounts in the event that an account user forgets a user-settable password. Having a static password that provides access to an account is a security vulnerability.

As an alternative to maintaining a back door account for password restoration purposes, an external password recovery agent may be kept up to date with the user-set password or passwords for one or more accounts. This poses logistical obstacles as well as potential security problems.

Cost is another factor that is a disadvantage to the present password restoration methods. When the number of such calls and the time spent by a customer service representative handling the calls are taken into account, this standard type of password restore system is quite expensive for manufacturers. In some cases, the cost of handling just one of these calls can be several hundred dollars.

Therefore, it would be advantageous if there were a method available by which a user who has forgotten a password to a system could restore or reset the password without having to provide or receive information by way of a customer service communication.

SUMMARY

Various implementations for resetting a user password are described. In some instances, the implementations may refer to "setting" instead of "resetting" a password. It is noted that these terms are interchangeable as used herein. Resetting merely refers to changing a password, while setting refers to creating a password where none existed before.

In particular, implementations creating a password reset disk and using the password reset disk to reset a user password in a computer system are shown. Utilizing the described systems and methods a user can create a password reset disk that—in the event that the user forgets her password—can be used to securely create a new password for the user without the user having to contact a third party.

A user creates a password reset disk by creating a public key/private key pair. The private key is stored on a removable computer-readable medium so that it can be stored safely by the user. The public key is used to encrypt a user password for a system. An encrypted version of the user password is stored on the system. Whenever the user changes her password, the new password is encrypted and is stored as the encrypted version of the user password.

If the user forgets her password, the user inserts the removable medium and the private key stored on the removable medium is used to decrypt the encrypted user password. If the decrypted password matches the current user password, the user is allowed to reset the user password and access the system.

The implementations describe several advantages. The scheme, being based on public key encryption algorithms, is important because it allows an asymmetric approach to the password reset problem in which the key that is used to encrypt data used in the password reset process is different from the key used to decrypt that data as part of the password reset process.

The feature in the described invention that the private key is stored on removable media is important because it allows the private key to be stored in a separate location from the computer system. This prevents the private key from being discovered on the computer system and used by an unauthorized party, such as in the case of a stolen computer, from which sensitive files could be stolen.

The described implementations accomplish the goals of reducing customer service calls for users who forget their passwords. In addition, it encourages users to utilize passwords where they may not have in the past because of the possibility of forgetting a password and having to go through a long process to regain access to the user's system. Finally, it allows users to reset user passwords without requiring administrative intervention.

DETAILED DESCRIPTION

Overview

In the described embodiments, systems and methods are provided for creating a password reset disk and using the password reset disk to gain access to a system for which a user has forgotten a user password and reset the user password, thereby allowing the user access to the system. Using the techniques described herein, the user does not have to contact a third party, such as a customer service department, to regain access to the system.

It is noted that in some instances, the implementations refer to "setting" a password, while in other instances, the implementations refer to "resetting" a password. It is noted that these terms are used interchangeably herein. Resetting merely refers to changing a password, while setting refers to creating a password where none existed before. Whether a current password exists or not is not critical to the operation of the described invention.

Furthermore, one meaning of "reset" known in the art means to set something—such as a variable—to zero. It is noted that, as used herein, the term "reset" means to change a user password from a first value to a second value.

Figure 1:
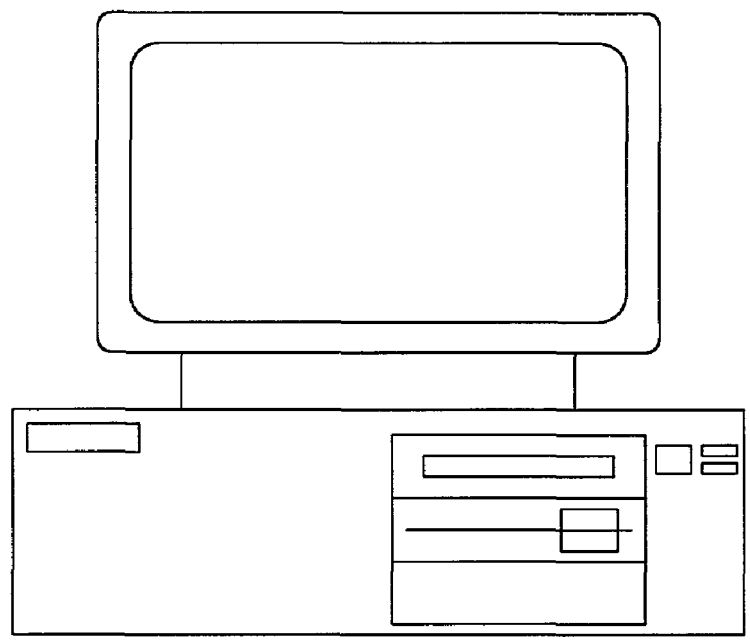
FIG. 1 is a high-level diagram of a computer system and a password reset disk associated with the computer system.
Figure 1:
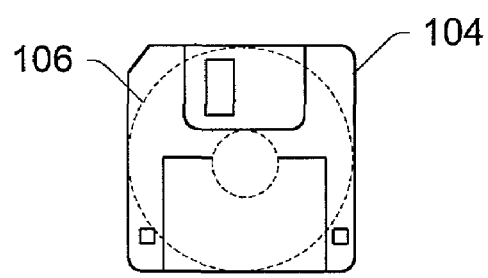

FIG. 1 is an illustration of a personal computer 100 and a password reset disk 102. The computer system described in the present invention is the personal computer 100, although virtually any computer system could be used to implement the invention. The password reset disk 102 includes a casing 104 that contains a computer-readable medium 106. In the present context, the password reset disk 102 is a typical floppy disk for the personal computer 100, although any type of removable computer-readable medium could be used to implement the claimed invention, such as: a magnetic strip card; a memory card; an integrated circuit card; a computer disk (CDROM/CDRW); or a digital versatile disk (DVD).

As will be described in greater detail, below, the password reset disk 102 is created by a user of the personal computer 100 and stored in a safe location. If the user happens to forget a user password and cannot access the personal computer 100, the password reset disk 102 may be inserted into the personal computer 100 and a password reset program may be executed on the personal computer 100 to reset the user password, thus allowing the user to regain access to the personal computer 100 without having to contact a third party, such as a customer service representative.

One advantage to the implementations described herein is that the user can create the password reset disk 102 any time after the user has access to the personal computer 110. Also, even if the user changes the user password one or more times after the password reset disk 102 is created, the password reset disk 102 can be used to reset the user password. These and other advantages will become clear as the present discussion progresses.

Exemplary Password Reset Disk System

Figure 2:
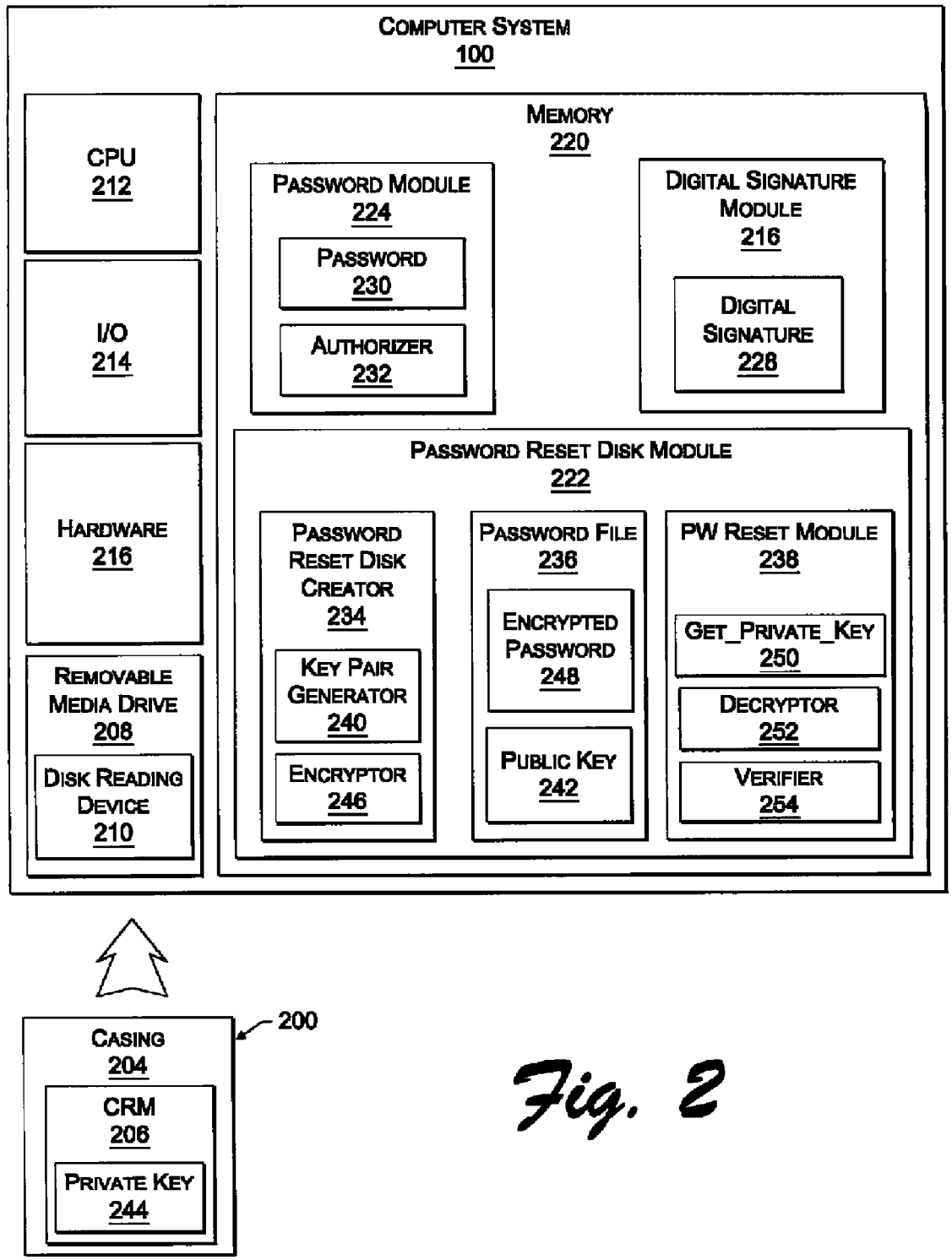
FIG. 2 is a block diagram of an exemplary password reset disk and system implemented in accordance with one described embodiment.

FIG. 2 is a block diagram of an exemplary password reset disk 200 and an exemplary password reset disk computer system 202 constructed in accordance with at least one implementation described herein. The computer system 202 may be used to create the password reset disk 200, which may be used to reset a user password that has been forgotten.

It is noted that although the exemplary password reset disk system is shown embodied in a computer system, the password reset disk system may be embodied in many forms. For example, the present invention may be implemented in cellular telephones, television set top boxes and the like, and may be present in may forms, including ROM-based, loaded from a storage medium, or loaded from a network. The present invention relates to any changeable authentication token that can be stored in encrypted form in the scope of the authentication. The encrypted form can be stored on a device including the password reset system, or it may be stored on a removable device (e.g., a smart card) or remotely stored at a remote location (e.g., a network server).

The password reset disk 200 includes a casing 204 that houses a computer-readable medium 206. The password reset disk 200 fits into a removable media drive 208 in the computer system 202. A disk reading device 210 in the removable media drive 208 is configured to read the computer-readable medium 206 of the password reset disk 200.

The computer system 202 also includes a central processing unit (CPU) 212, one or more input/output (I/O) devices 214 and various hardware components 216 typically found in a computer system similar to the computer system 202 shown. The computer system 202 also includes memory 220 that stores a password reset disk module 222, a password module 224 and a digital signature module 226. The digital signature module 226 generates a digital signature 228 that the digital signature module 226 is configured to attach to one or more files on the computer system 202.

The password module 224 includes one or more user passwords 230 and an authorizer 232. Although the user passwords 230 may include more than one user password, for discussion purposes, reference hereinafter will be made to a user password 230 and to resetting one user password 230. It is also noted that the user password 230 does not necessarily have to be the actual user password, but may be a representation of the user password, such as a hash. It is also noted that, although the term 'user password' is used, the present invention is not limited to working with user accounts on a computer system. For instance, the user password may be a system password that must be used to access the computer system itself.

The user password 230 must be entered before a user (not shown) can access the computer system 202, and may be changed by a user. The authorizer 232 is configured to request a password from a user before the user is allowed to access the computer system 202 and to certify that a password entered by a user matches the user password 230 stored in the password module 224.

The password reset disk module 222 includes a password reset disk creator 234, a password file 236 and a password reset module 238. It is noted that although the password file 236 is shown as being located on the computer system 200, the password file 236 may be stored remote from the computer system 200. Generally, it is noted that any file shown stored within the computer system 200 may be stored separate from the computer system 200.

The password reset disk creator 234 includes a key pair generator 240 that is configured to generate a public key 242 and a private key 244 for each user password 230 used in the computer system 100. Since this particular discussion pertains to a single user password, only one public key 242 and one private key 244 will be discussed. The public key 242 is stored in the password file 236 and the private key 244 is stored on the computer-readable medium 206 of the password reset disk 200. It is noted that although the public key 242 is shown stored in the password file 236, the public key 242 may be stored elsewhere on the computer system 100. The password reset disk creator 234 also includes an encryptor 246. The encryptor 246 is configured to encrypt the user password 230 with the public key 242 to create an encrypted password 248, there being one encrypted password 248 corresponding to each user password 230. Since this discussion uses an example of only one user password 230, only one encrypted password 248 will be discussed, although there may be more than one encrypted password 248. The encrypted password 248 is also stored in the password file 236.

The password reset module 238 includes a get_private_key module 250, a decryptor 252 and a verifier 254. The get_private_key module 250 is configured to retrieve the private key 244 from the password reset disk 200. The decryptor 252 is configured to decrypt the encrypted password 248 with the private key 244. The verifier 254 is configured to determine if the decryptor 252 successfully decrypts the encrypted password 248 with the private key 244.

The elements shown in FIG. 2 and the functions thereof will be described in greater detail below with respect to the remaining figures.

Methodological Implementation: Password Module

Figure 3:
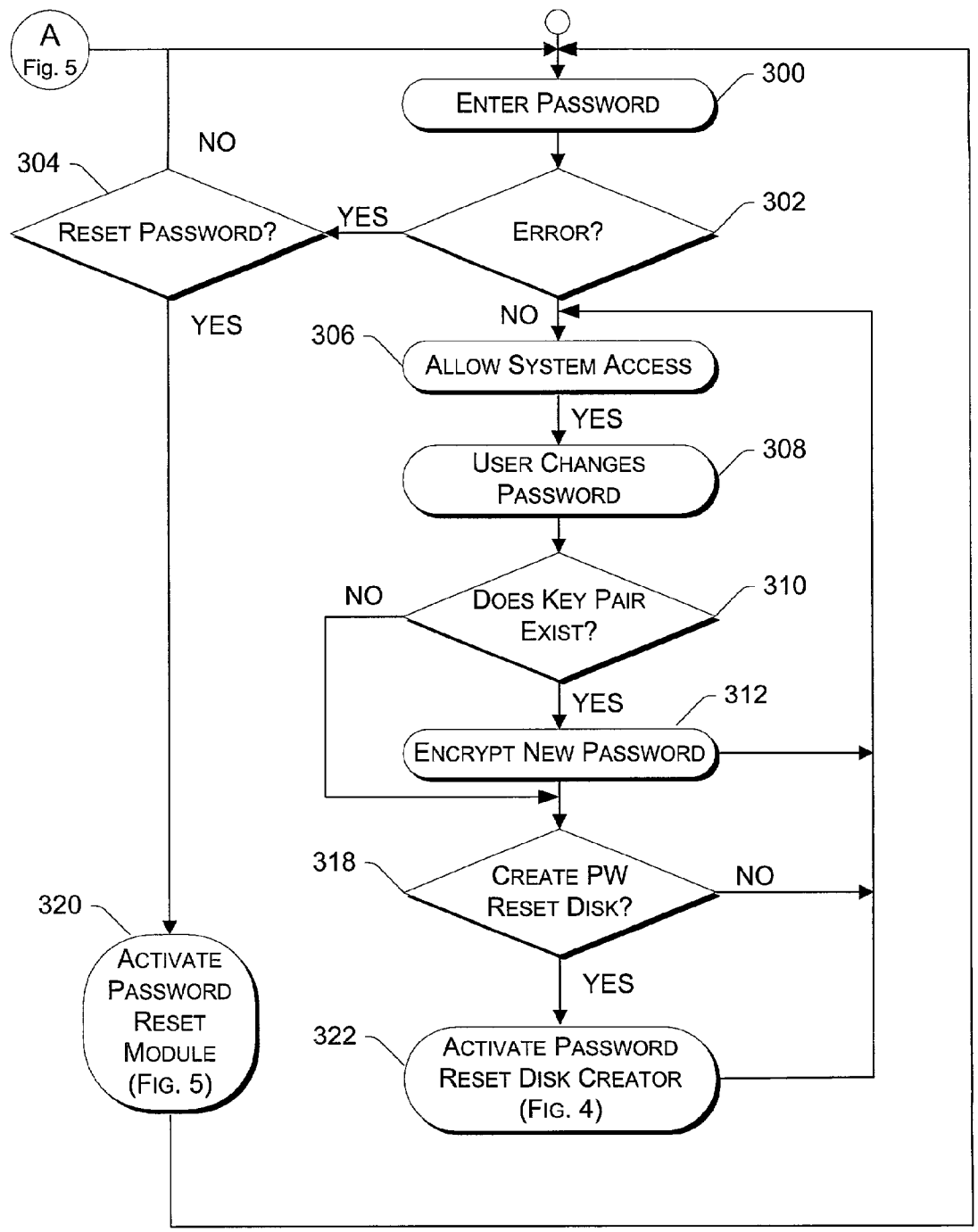
FIG. 3 is a flow diagram depicting a methodological implementation of a password module as described herein.

FIG. 3 is a flow diagram depicting a methodological implementation of the password module 224 shown in FIG. 2. In the discussion of FIG. 3, continuing reference will be made to the elements and reference numerals described in FIG. 2.

At block 300, a user enters the user password 230 to gain access to the computer system 202. If there is an error ("Yes" branch, block 302), then the user is prompted as to whether the user wishes to run a password reset program (i.e., the password reset module 238) in the event that the user has forgotten his or her password. If the user does not wish to run the password reset module 238 ("No" branch, block 304), then the user re-enters the user password 230 at block 300. If the user, however, has forgotten his or her password and wishes to activate the password reset module 238 ("Yes" branch, block 304), then the password reset module 238 is activated at block 320. If the user enters the user password 230 correctly ("No" branch, block 302), then the user is allowed to access the computer system 202 at block 306.

As long as the user does not want to change the password, the user may continue to access the computer system 202 (block 306). If the user wants to change the user password 230, then the user enters a new user password 230 at block 308. The user may be required to re-enter the new user password 230 to confirm the user password 230.

If the user has previously created a password reset disk, then a private key/public key pair has already been created. If such a key pair exists ("Yes" branch, block 310), then the new password is encrypted with the public key (block 312) and is stored, replacing any previous encrypted version of a user password if one exists. If such a key pair does not exist ("No" branch, block 310), then the new password is not encrypted and the process continues at block 318.

At block 318, the user is queried as to whether the user wants to create a password reset disk 200 at this time. If the user does not want to create a password reset disk 200 with the newly reset password 230 ("No" branch, block 318), then the user simply continues to access the computer system 202 at block 306. If the user wants to create a password reset disk 200 with the new user password 230 ("Yes" branch, block 318), then the password reset disk creator 234 is activated at block 322. The methodology of the password reset module 238 and the password reset disk creator 234 are discussed in greater detail below, with continuing reference to the elements and reference numerals previously recited.

Methodological Implementation: Password Reset Disk Module

Figure 4:
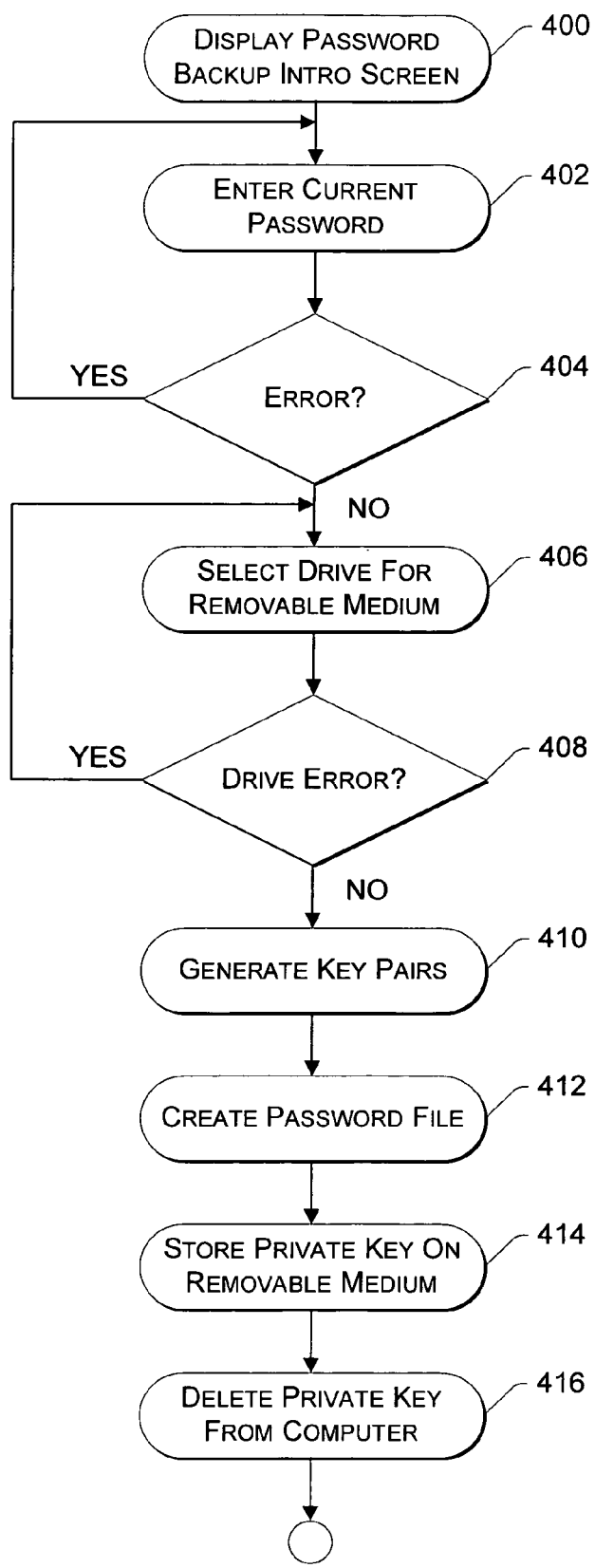
FIG. 4 is a flow diagram depicting a methodological implementation of a password reset disk creator as described herein.

FIG. 4 is a flow diagram depicting a methodological implementation of the password reset disk creator 234. The password reset disk creator 234 is activated when a user wants to create a password reset disk 200 that allows the user to reset the user password 230 in the event that the user forgets the user password 230.

At block 400, a display password backup intro screen (not shown) is displayed. The user enters the current user password 230 at block 402. If the user password 230 entered by the user is incorrect ("Yes" branch, block 404), then the user may re-enter the user password 230 at block 402. If the password is entered correctly ("No" branch, block 404), then the user selects a removable media drive 208 (block 406) that contains a computer-readable medium 206 that will be used to create the password reset disk 200. If there is an error in the drive identification ("Yes" branch, block 408), the user may re-enter the drive at block 406.

If there is no error ("No" branch, block 408), then the key pair generator 240 generates the public key 242 and the private key 244 at block 410. If the password file 236 does not already exist, it is created at block 412. As shown, the public key 242 is stored in the password file 236. The user password 230 is encrypted with the public key 242 to create the encrypted password 248, which is then stored in the password file 236. To protect the integrity of the password file 236, the digital signature module 226 may attach the digital signature 228 to the password file 236. Whenever the password file 236 is subsequently accessed, the digital signature 228 is verified before a process is allowed to continue. However, digitally signing the password file 236 is optional.

The private key 244 is stored on the password reset disk 200 at block 414. At block 416, any version(s) of the private key 244 that may remain on the computer system 202 or anywhere other than the password reset disk 200 are deleted. The user then may store the password reset disk 200 in a safe, secure location so that it may be used in the event that the user subsequently forgets the user password 230.

Methodological Implementation: Password Reset Module

Figure 5:
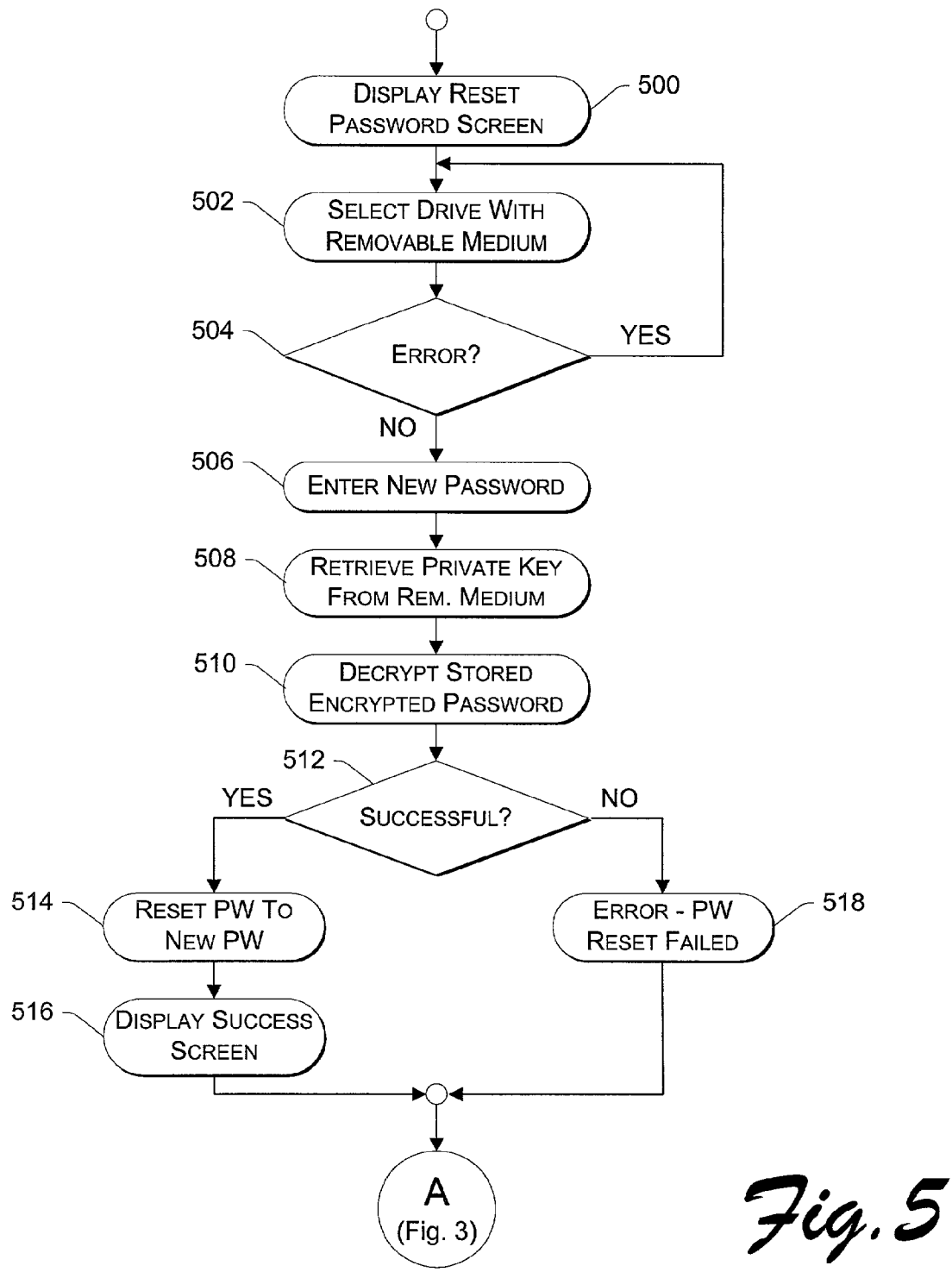
FIG. 5 is a flow diagram depicting a methodological implementation of a password reset module as described herein.

FIG. 5 is a flow diagram depicting a methodological implementation of the password reset module 238. The password reset module 238 is activated in the event that a user forgets the user password 230 that allows the user to access the computer system 202. The password reset module 238 may only be utilized if a password reset disk 200 has been created at a previous time.

At block 500, a reset password screen (not shown) is displayed to the user. At block 502, the user selects the removable media drive 208 in which the password reset disk 200 is inserted. If the removable media drive 208 is not functional or if the password reset disk 200 is not inserted into the removable media drive 208 ("Yes" branch, block 504), then the user must re-select the removable media drive 208. If the removable media drive 208 is operational and the password reset disk is in the removable media drive 208 ("No" branch, block 504), then the user enters a new, or proposed, password at block 506. The new user password 230 is merely proposed at this point because it is not accepted as the user password 230 until further processing has been completed.

At block 508, the get_private_key module 250 retrieves the private key 244 from the password reset disk 200 in the removable media drive 208. The decryptor 252 attempts to decrypt the encrypted password 248 with the private key 244 at block 510. If the verifier 254 determines that the decryption is successful, i.e., the decrypted version of the encrypted password is the same as the current password ("Yes" branch, block 512), then the user password 230 is reset to the proposed password entered at block 506. A screen (not shown) may be displayed to the user at block 516 to indicate that the password reset process was successful. If the decryption is unsuccessful ("No" branch, block 512), then the password reset process has failed (block 518) and the user password 230 remains the same.

It is noted that there are several types of encryption methods that may be used with the password reset disk system and methods described herein. Depending on which type of encryption method is utilized, the determination of whether the process was successful or not (block 512) may differ. In the described implementation that utilizes a public key 242 and a corresponding private key 244, the mere fact that the private key can decrypt the encrypted password 248 is ample evidence that the private key 244 is the private key 244 that corresponds to the public key 242 used to create the encrypted password 248. With other encryption schemes, however, the verifier may have to accomplish one or more other steps.

Those skilled in the art will recognize what is required to validate the password reset disk and reset the password, so it is not necessary to give details of other implementations herein.

Disk Creation—No User Password

It is noted that a user may create a password reset disk even if the user has not created a user password. In such a case, a private key/public key pair is generated and the private key is stored on a removable medium while the public key is stored on the computer system. If, at a later time, the user sets a user password, the user password is encrypted with the public key and an encrypted version of the user password is stored on the computer system. Then, if the user forgets her password, the password reset disk may be used to decrypt the encrypted user password and allow the user to reset the user password and access the computer system.

Exemplary Computer System

Figure 6:
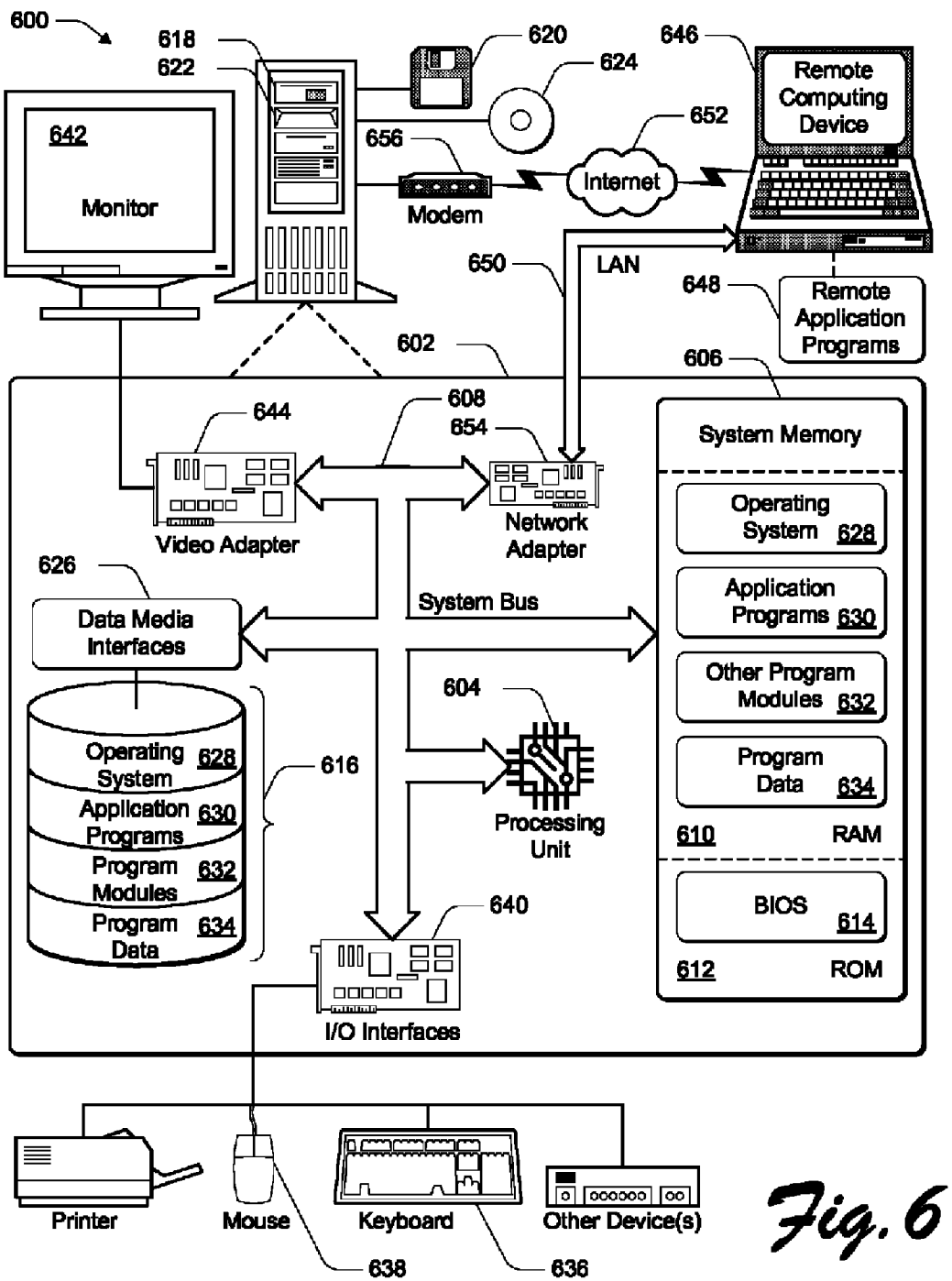
FIG. 6 is a diagram of an exemplary system on which the present invention may be implemented.

FIG. 6 shows an exemplary computer system 600 that can be used to implement various computing devices, i.e., client computers, servers and the like, in accordance with the described embodiments.

Computer 602 includes one or more processors or processing units 604, a system memory 606, and a bus 608 that couples various system components including the system memory 606 to processors 604. The bus 608 represents one or more of any of several types of bus structures, including a memory bus or memory controller, a peripheral bus, an accelerated graphics port, and a processor or local bus using any of a variety of bus architectures. The system memory 606 includes random access memory (RAM) 610 and read only memory (ROM) 612. A basic input/output system (BIOS) 614, containing the basic routines that help to transfer information between elements within computer 602, such as during start-up, is stored in ROM 612.

Computer 602 further includes a hard disk drive for reading from and writing to a hard disk 616, a magnetic disk drive 618 for reading from and writing to a removable magnetic disk 620, and an optical disk drive 622 for reading from or writing to a removable optical disk 624 such as a CD ROM or other optical media. The hard disk drive 616, magnetic disk drive 618, and optical disk drive 622 are connected to the bus 608 by one or more data media interfaces 626, such as an SCSI interface or some other appropriate interface. The drives and their associated computer-readable media provide nonvolatile storage of computer-readable instructions, data structures, program modules and other data for computer 602. Although the exemplary environment described herein employs a hard disk 616, a removable magnetic disk 620 and a removable optical disk 642 624, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 616, magnetic disk 620, optical disk 624, RAM 610, or ROM 612, including an operating system 628, one or more application programs 630, other program modules 632, and program data 634. A user may enter commands and information into computer 602 through input devices such as a keyboard 636 and a pointing device 638. Other input devices (not shown) may include a microphone, joystick, game pad, satellite dish, scanner, or the like. These and other input devices are connected to the processing unit 604 through an interface 640 that is coupled to the bus 608. A monitor 642 or other type of display device is also connected to the bus 608 via an interface, such as a video adapter 644. In addition to the monitor, personal computers typically include other peripheral output devices (not shown) such as speakers and printers.

Computer 602 commonly operates in a networked environment using logical connections to one or more remote computers, such as a remote computer 646. The remote computer 646 may be another personal computer, a server, a router, a network PC, a peer device or other common network node, and typically includes many or all of the elements described above relative to computer 602, although only a memory storage device 648 has been illustrated in FIG. 6. The logical connections depicted in FIG. 6 include a local area network (LAN) 650 and a wide area network (WAN) 652. Such networking environments are commonplace in offices, enterprise-wide computer networks, intranets, and the Internet.

When used in a LAN networking environment, computer 602 is connected to the local network 650 through a network interface or adapter 654. When used in a WAN networking environment, computer 602 typically includes a modem 656 or other means for establishing communications over the wide area network 652, such as the Internet. The modem 656, which may be internal or external, is connected to the bus 608 via a serial port interface (not shown). In a networked environment, program modules depicted relative to the personal computer 602, or portions thereof, may be stored in the remote memory storage device. It will be appreciated that the network connections shown are exemplary and other means of establishing a communications link between the computers may be used.

Generally, the data processors of computer 602 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The above-described methods and systems provide a way to create a password reset disk that can be used to reset a user password in the event that an authorized computer system user forgets the user password that allows the user to access the computer system. Use of the systems and methods described herein relieves the user of having to contact customer service and go through a lengthy process to remind the user of the password. Safeguards are included that prevent any person other than the authorized user from resetting the user password without the disk.

Although the invention has been described in language specific to structural features and/or methodological steps, it is to be understood that the invention defined in the appended claims is not necessarily limited to the specific features or steps Zone described. Rather, the specific features and steps are disclosed as preferred forms of implementing the claimed invention.

The invention claimed is:

1. A method performed by a computer system for resetting a user password on the computer system, comprising:
    receiving a user-specified password that allows a user access to the computer system;
    encrypting the user-specified password with a public key to generate an encrypted password;
    storing the encrypted password and the public key in a memory accessible to the computer system;
    storing a private key that corresponds to the public key on a removable computer-readable medium, wherein neither the user-specified password nor the encrypted password is stored on the removable computer-readable medium, and wherein the private key, in and of itself, does not provide user access to the computer system;
    receiving an indication that the user has forgotten the user-specified password;
    in response to receiving the indication that the user has forgotten the user-specified password:
        detecting that the removable computer-readable medium is communicatively connected to the computer system;
        the computer system retrieving the private key from the removable computer-readable medium;
        locating in the memory accessible to the computer system, the encrypted password that was encrypted with the public key that corresponds to the private key;
        decrypting the encrypted password with the private key; and
        allowing the user-specified password to be reset if decryption is successful.

2. The method as recited in claim 1, further comprising selecting a removable media drive in which the removable computer-readable medium is located prior to retrieving the private key.

3. The method as recited in claim 1, wherein the decryption is successful when a decrypted version of the encrypted password is identical to the user-specified password specified by the user during the most recent password change operation.

4. The method as recited in claim 1, further comprising:
    receiving a new user-specified password to replace the previously encrypted user-specified password;
    encrypting the new user-specified password with the public key to generate a new encrypted password;
    storing the new encrypted password in place of the previously encrypted password with the public key in the memory accessible to the computer system;
    in response to receiving the indication that the user has forgotten the new user-specified password,
        detecting that the removable computer-readable medium is communicatively connected to the computer system;
        the computer system retrieving the private key from the removable computer-readable medium, wherein the private key is the same private key that was stored to the removable computer-readable medium when the previous user-specified password was encrypted;
        locating in the memory accessible to the computer system, the encrypted password that was encrypted with the public key that corresponds to the private key;
        decrypting the encrypted password with the private key; and
        allowing the user-specified password to be reset if decryption is successful.

5. A computer system, comprising:
    one or more processors;
    a memory including modules that are executable by the one or more processors, the modules comprising:
        a password module to receive a user password and to control access to the computer system with the user password; and
    a disk creator to:
        generate a public key/private key pair such that data encrypted with the public key can be decrypted with the private key;
        encrypt the user password with the public key, generating an encrypted password;
        store the encrypted password and the public key in the memory accessible to the computer system, in which neither the user password nor the encrypted password is stored on a removable computer-readable medium; and
        store the private key on the removable computer-readable medium, in which the private key, in and of itself, does not provide access to the computer system;
    wherein the removable computer-readable medium can be stored remote from the computer system and subsequently made available to the computer system to enable the computer system to:
        receive a user-submitted proposed new password;
        detect that the removable computer-readable medium is communicatively connected to the computer system;
        retrieve the private key stored in the removable computer-readable medium;
        use the retrieved private key to decrypt the encrypted password stored in the memory accessible to the computer system to generate a decrypted password; and
        if the decrypted password is the same as the user password, change the user password to the proposed new password.

6. The computer system as recited in claim 5, further comprising a password file stored in the memory accessible to the computer system, the password file containing the public key and the encrypted password.

7. The computer system as recited in claim 6, further comprising a digital signature module configured to digitally sign the password file.

8. The computer system as recited in claim 5, further comprising a password reset module configured to retrieve the private key from the removable computer-readable medium, attempt to decrypt the encrypted user password with the private key and, if the decryption is successful, to reset the user password.

9. The computer system as recited in claim 8, wherein the password module is further configured to query whether to activate the password reset module if an incorrect user password is received.

10. The computer system as recited in claim 8, wherein the password module is further configured to query whether to activate the password reset module if an incorrect user password is received and the private key has previously been created and stored on the removable computer-readable medium.

11. The computer system as recited in claim 5, wherein the disk creator is further configured to encrypt a new user password and store a new encrypted password, without re-storing the private key to the removable computer-readable medium, whenever the user password is changed.

12. A method performed by a computer system for creating a password reset disk, comprising:

generating a key pair having a public key and a corresponding private key; storing the private key on a removable computer-readable medium to create the password reset disk, in which the private key, in and of itself, does not provide user access to the computer system;

creating a password file that contains the public key and a user password encrypted with the public key; and storing the password file in a memory separate from the removable computer readable medium, in which neither the user password nor the user password encrypted with the public key is stored on the removable computer-readable medium;

wherein the password reset disk can be stored remote from the computer system, and a lost user password can subsequently be replaced by enabling the computer system to:

detect that the password reset disk is communicatively connected to the computer system;

retrieve the private key from the password reset disk;

use the private key to decrypt the encrypted user password in the password file; and if the decryption is successful, authorize a user to change the user password.

13. The method as recited in claim 12, further comprising removing any version of the private key that may exist somewhere other than on the removable computer-readable medium.

14. The method as recited in claim 12, further comprising selecting a removable media drive in which the removable computer-readable medium is located.

15. The method as recited in claim 12, wherein the public key and the encrypted version of the user password are created at different times.

16. A computer system, comprising:
one or more processors;
a memory including modules that are executable by the one or more processors, the modules comprising:
a password file that contains a public key and an encrypted user password that is created by encrypting a user password with the public key, wherein the user password enables a user to access the computer system, the password file being maintained in a memory accessible to the computer system; and
a password reset module that:
detects that a removable computer-readable medium is communicatively connected to the computer system;
retrieves a private key from the removable computer-readable medium, the private key corresponding to the public key, in which the private key, in and of itself, does not provide user access to the computer system, and in which neither the user password nor the encrypted user password is stored on the removable computer-readable medium, the removable computer-readable medium being separate and distinct from the memory accessible to the computer system;
decrypts the encrypted user password from the password file with the private key retrieved from the removable computer-readable medium; and
if decrypting the encrypted user password is successful, replaces the user password with a new user password.

17. The system as recited in claim 16, wherein the decrypting the encrypted user password is deemed to be successful if the decryption results in the user password.

18. The system as recited in claim 16, wherein the private key and the public key were generated contemporaneously, and the user password is the user password that was active when the private key and public key were generated.

19. The system as recited in claim 16, further comprising a removable media drive configured to accept the removable computer-readable medium containing the private key.

20. The system as recited in claim 16, further comprising a key generator configured to generate the private key and the public key.

21. The system as recited in claim 16, further comprising a digital signature module configured to digitally sign the password file.

22. The system as recited in claim 16, further comprising a password module configured to activate the password reset module when an invalid user password is entered to access the system.

23. The system as recited in claim 16, further comprising a password module configured to offer an option to activate the password reset module when an invalid user password is entered to access the system if a password reset disk has previously been created.

24. The computer system as recited in claim 16, wherein the removable computer-readable medium comprises one of the following: a magnetic strip card; a memory card; an integrated circuit card; a floppy disk; a computer disk (CD); or a digital versatile disk (DVD).

25. One or more computer-readable storage devices comprising computer-executable instructions that, when executed, cause a computer system to:
generate a public key/private key pair;
store the private key on a removable computer-readable medium;
encrypt a user password with the public key to create an encrypted user password;
store the encrypted user password and the public key in the computer system, separate and distinct from the removable computer-readable medium;
receive a user request to change the user password to a new user password;
receive and encrypt the new user password to generate a new encrypted user password;
replace the stored encrypted user password with the new encrypted user password, while not modifying the private key stored on the removable computer-readable medium;
receive an indication that the new user password has been forgotten;
receive the private key from the removable computer-readable medium;
decrypt the new encrypted user password using the private key;
in an event that the private key successfully decrypts the new encrypted user password, enable a user to submit another new user password; and
allow the user to access additional data on the computer system only after the another new user password has been established;
wherein the computer system initially requires the user password to provide access to the computer system, and subsequently requires the another new user password to provide access to the computer system.

26. The one or more computer-readable storage devices as recited in claim 25, further comprising computer-executable instructions that, when executed, cause the computer system to digitally sign the encrypted user password.

27. The one or more computer-readable storage devices as recited in claim 25, further comprising digitally-executable instructions that, when executed, cause the computer system to digitally sign a password file that contains the encrypted user password and the public key.

28. The one or more computer-readable storage devices as recited in claim 25, further comprising computer-executable instructions that, when executed, cause the computer system to remove any version of the private key that is not on the removable computer-readable medium.

29. One or more computer-readable storage devices containing computer-executable instructions that, when executed, cause a computer system to:
receive a request to reset a user password associated with a password file that includes a public key and an encrypted user password, in which the user password provides access to the computer system, the password file being maintained in a memory on the computer system, in which neither the user password nor the encrypted user password is stored on a removable computer-readable medium;
detect that the removable computer-readable medium is communicatively connected to the computer system;
retrieve a private key from the removable computer-readable medium, wherein the private key, in and of itself, does not provide user access to data on the computer system;
locate, on the computer system, the encrypted user password that is the user password that has been encrypted with the public key that corresponds to the private key;
decrypt the encrypted user password with the private key; and if the decryption is successful:
change the user password associated with the password file to a new user password that allows access to the computer system; and
only after the new user password is established, allow a user using the new user password to access data other than the encrypted password on the computer system.

30. The one or more computer-readable storage devices as recited in claim 29, wherein the decrypted version of the encrypted user password is the same as the current user password.

31. The one or more computer-readable storage devices as recited in claim 29, further comprising computer-executable instructions that, when executed, cause the computer system to validate a digital signature associated with the encrypted user password and proceeding only if the digital signature is valid.

32. The one or more computer-readable storage devices as recited in claim 29, further comprising computer-executable instructions that, when executed, cause the computer system to receive an indication identifying a removable media drive in which the removable computer-readable medium is located.

33. A method performed by a computer system for creating a password reset disk, the method comprising:
identifying a user account on the computer system, wherein the user account does not yet have an associated password for accessing the computer system;
while the user account does not have an associated password for accessing the computer system:
creating a public key and a corresponding private key;
storing, in a memory associated with the computer system, the public key in a password file, such that the public key is associated in the password file with the user account;
detecting a removable computer-readable medium that is currently communicatively connected to the computer system; and
storing the private key to the removable computer-readable medium, such that the private key is stored separate and distinct from the public key;
subsequently receiving a password to be associated with the user account such that user access to the computer system requires that a user of the user account enter the password;
in response to receiving the password to be associated with the user account:
encrypting the password with the public key to generate an encrypted password; and
storing, in the memory associated with the computer system, the encrypted password in the password file with the public key, such that the public key and the encrypted password are associated in the password file with the user account, in which neither the password nor the encrypted password is stored on the removable computer-readable medium, and in which the private key, in and of itself, does not provide access to the computer system;
wherein no change is made to the private key stored on the removable computer-readable medium after the password is received and encrypted;
retrieving the private key from the removable computer-readable medium communicatively coupled to the computer system;
using the retrieved private key to decrypt the encrypted password associated with the user account and stored in the password file; and in an event that the decryption results in the password associated with the user account:
accepting a new password to be associated with the user account; and
in the password file, replacing the encrypted password with a new encrypted password.

34. A method as recited in claim 33, further comprising:
receiving an indication that the user is requesting to reset the password associated with the user account;
in an event that the decryption does not result in the password associated with the user account, refusing to reset the password associated with the user account; and
in the event that the decryption results in the password associated with the user account:
using the public key associated in the password file with the user account to encrypt the new password to be associated with the user account to generate the new encrypted password;
wherein the unchanged private key stored on the removable computer-readable medium is usable to subsequently decrypt the new encrypted password.

* * * * *